United States Patent
Ishikawa (10) Patent No.: US 8,130,605 B2
(45) Date of Patent: Mar. 6, 2012

(54) DRIVING DEVICE AND METHOD, PROGRAM, AND RECORDING MEDIUM

(75) Inventor: Hideki Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 12/496,079

(22) Filed: Jul. 1, 2009

(65) Prior Publication Data

US 2010/0002553 A1    Jan. 7, 2010

(30) Foreign Application Priority Data

Jul. 1, 2008    (JP) ................................ P2008-172460

(51) Int. Cl.
*G11B 20/00*    (2006.01)
(52) U.S. Cl. ................ 369/47.15; 369/44.28; 369/44.25
(58) Field of Classification Search ............... 369/44.28, 369/44.25, 47.15
See application file for complete search history.

(56) References Cited

U.S. PATENT DOCUMENTS

| | | | |
|---|---|---|---|
| 6,208,597 B1* | 3/2001 | Yoshimi | 369/44.29 |
| 6,252,835 B1* | 6/2001 | Choi | 369/44.29 |
| 6,584,048 B1* | 6/2003 | Tateishi et al. | 369/44.28 |
| 2007/0127331 A1* | 6/2007 | Lee et al. | 369/44.29 |
| 2009/0046549 A1* | 2/2009 | Takazawa et al. | 369/44.32 |

* cited by examiner

*Primary Examiner* — Wayne Young
*Assistant Examiner* — Linh Nguyen
(74) *Attorney, Agent, or Firm* — Oblon, Spivak, McClelland, Maier & Neustadt, L.L.P.

(57) ABSTRACT

A driving device includes an optical pickup unit that irradiates a disc having a plurality of recording surfaces with a laser beam used for recording or reproducing information, and a generating unit that generates a focus control signal used for controlling a focus state of the laser beam emitted from the optical pickup unit on the basis of a focus error signal. The generating unit includes level detector that detects a level of the focus error signal, an offset generator that generates an offset signal used for performing focus jumping from one of the plurality of recording surfaces to another one of the plurality of recording surfaces in accordance with the focus error signal, and a switcher that switches a polarity of the focus control signal by comparing the level of the focus error signal of the level detector with a threshold value.

6 Claims, 9 Drawing Sheets

DRIVING DEVICE AND METHOD, PROGRAM, AND RECORDING MEDIUM

BACKGROUND OF THE INVENTION

1. Field of the Invention

The present invention relates to a driving device and method, a program, and a recording medium. More particularly, the present invention relates to a driving device and method, a program, and a recording medium, which make it possible to reliably perform focus jumping with respect to a multilayer disc having two or more recording layers.

2. Description of the Related Art

Hitherto, compact discs (CDs) and digital versatile discs (DVDs) have been widely used as optical discs on which recording/reproducing operations are performed by an optical disc driving device. The DVDs are available as DVD-SL having one recording surface and DVD-DL having two recording surfaces.

In recent years, Blu-ray discs (BDs), which are optical discs having a still larger capacity than, for example, DVDs, have been standardized, and their range of use is being increased. The BDs are also available as those having one recording surface and those having two recording surfaces. In addition, BDs having two or more recording surfaces have also been proposed.

In such multilayer discs having a plurality of recording surfaces, when a reproducing operation or a recording operation is performed on a different recording layer, such as from a first layer to a second layer, focus jumping is executed. The way in which focus jumping is performed is described in, for example, Japanese Unexamined Patent Application Publication No. 2000-298846 (Patent Document 1).

SUMMARY OF THE INVENTION

In an exemplary focus jumping operation, a jump pulse including an acceleration signal and a deceleration signal is applied to a focus servo loop, and control is performed so that a pickup jumps to another recording surface. Then, focus servo is performed so that the level of a focus error signal (hereunder referred to as the "FE" signal) is reduced at the another recording surface.

In this focus jumping method, an objective lens may not be stopped because a sufficient deceleration signal is not applied to the objective lens. Therefore, a focus position of a light beam moves beyond a target recording surface. This prevents the light beam from being focused, as a result of which the focus jumping operation may be unsuccessfully performed.

To overcome this problem, Patent Document 1 proposes the following. That is, when such a focus jumping operation is executed, in addition to detecting FE signals, a detection is made that FE signal levels have exceeded respective threshold values, without carrying out time measurement for providing a timing at which the acceleration signal is switched. This causes the acceleration signal to be output.

However, in the method discussed in Patent Document 1, when, in outputting the acceleration signal after stopping the focus servo operation once, an external disturbance (such as vibration or shock) is applied while the acceleration signal is being output (that is, when the focus servo operation is not being performed), the FE signals are greatly disturbed. As a result, the focus servo loop may be unsuccessfully closed at a target recording surface.

In view of such a situation, it is desirable to make it possible to precisely perform a focus jumping operation even if there are external disturbances.

According to an embodiment of the present invention, there is provided a driving device including optical pickup means for irradiating a disc having a plurality of recording surfaces with a laser beam used for recording or reproducing information, and generating means for generating a focus control signal used for controlling a focus state of the laser beam emitted from the optical pickup means on the basis of a focus error signal. The generating means includes level detecting means for detecting a level of the focus error signal, offset generating means for generating an offset signal used for performing focus jumping from one of the plurality of recording surfaces to another one of the plurality of recording surfaces in accordance with the focus error signal, and switching means for switching a polarity of the focus control signal by comparing the level of the focus error signal of the level detecting means with a threshold value.

In one form, when the level of the focus error signal becomes less than a first threshold value, the switching means switches the polarity, and, then, when the level of the focus error signal becomes greater than a second threshold value, the switching means switches the polarity; and, when the level of the focus error signal becomes less than a third threshold value, the offset generating means stops the generation of the offset signal.

In another form, when the level of the focus error signal becomes less than a first threshold value, the switching means switches the polarity, and, then, when the level of the focus error signal becomes greater than a second threshold value, the switching means switches the polarity; and when the level of the focus error signal becomes greater than a third threshold value, the offset generating means causes a level of the offset signal to be constant. In addition, spherical aberration is corrected while the level of the offset signal is constant, and, when the correction of the spherical aberration ends, the offset generating means starts to output the offset signal again.

According to another embodiment of the present invention, there is provided a method of driving a driving device including optical pickup means for irradiating a disc having a plurality of recording surfaces with a laser beam used for recording or reproducing information, and generating means for generating a focus control signal used for controlling a focus state of the laser beam emitted from the optical pickup means on the basis of a focus error signal. The method includes the steps of detecting a level of the focus error signal; controlling generation of an offset signal used for performing focus jumping from one of the plurality of recording surfaces to another one of the plurality of recording surfaces in accordance with the focus error signal; and switching a polarity of the focus control signal by comparing the level of the focus error signal with a threshold value. The generating means performs the detecting step, the controlling step, and the switching step.

According to still another embodiment of the present invention, there is provided a program which is readable by a computer that causes generating means of a driving device to execute a process. The driving device includes optical pickup means for irradiating a disc having a plurality of recording surfaces with a laser beam used for recording or reproducing information and the generating means for generating a focus control signal used for controlling a focus state of the laser beam emitted from the optical pickup means on the basis of a focus error signal. The process includes the steps of detecting a level of the focus error signal; controlling generation of an offset signal used for performing focus jumping from one of the plurality of recording surfaces to another one of the plu- rality of recording surfaces in accordance with the focus error signal; and switching a polarity of the focus control signal by comparing the level of the focus error signal with a threshold value.

According to still another embodiment of the present invention, there is provided a recording medium on which a program which is readable by a computer that causes generating means of a driving device to execute a process is recorded. The driving device includes optical pickup means for irradiating a disc having a plurality of recording surfaces with a laser beam used for recording or reproducing information and the generating means for generating a focus control signal used for controlling a focus state of the laser beam emitted from the optical pickup means on the basis of a focus error signal. The process includes the steps of detecting a level of the focus error signal; controlling generation of an offset signal used for performing focus jumping from one of the plurality of recording surfaces to another one of the plurality of recording surfaces in accordance with the focus error signal; and switching a polarity of the focus control signal by comparing the level of the focus error signal with a threshold value.

In the driving device and method, the program, and the recording medium according to the embodiments of the present invention, when the focus jumping operation performed with respect to the disc having a plurality of recording surfaces is controlled, the polarity of the focus control signal is switched on the basis of the focus error signal level, so that the focus is controlled on the basis of the focus control signal whose polarity is switched.

According to these embodiments of the present invention, the focus jumping operation can be precisely performed even if there are, for example, external disturbances.

DESCRIPTION OF THE PREFERRED EMBODIMENTS

Embodiments of the present invention will hereunder be described with reference to the drawings.

Figure 1:
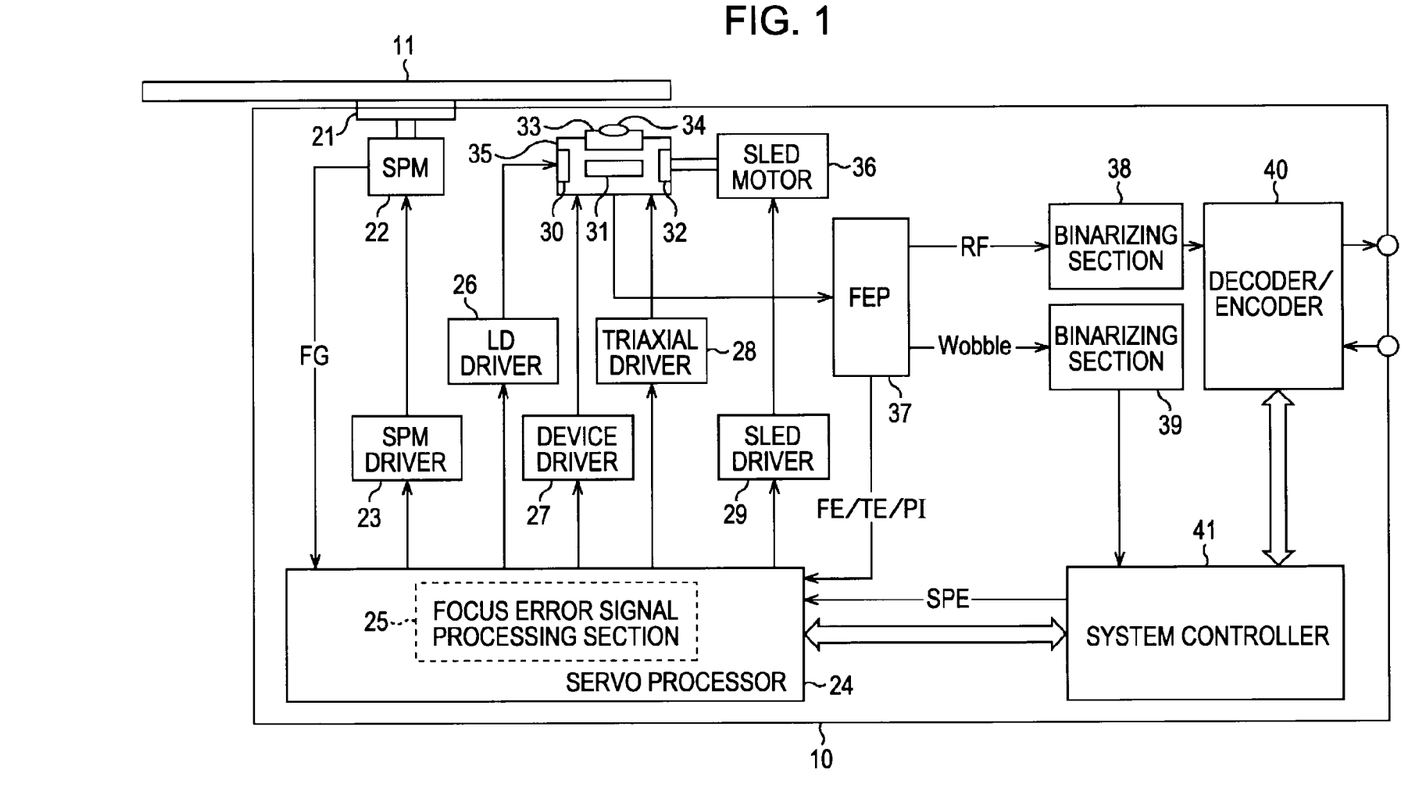
FIG. 1 shows the structure of a driving device according to an embodiment to which the present invention is applied.

FIG. 1 shows the structure of a driving device according to an embodiment to which the present invention is applied. The driving device shown in FIG. 1 drives a predetermined disc. Examples of the predetermined disc are a digital versatile disc (DVD) described later with reference to FIG. 3, and a Blu-ray disc (BD) described later with reference to FIG. 4. Among such types of discs, there are some having a plurality of recording surfaces. Such discs are called, for example, multilayer discs. The driving device to which the present invention is applied is, in particular, suitable for use when such multilayer discs are being handled.

The driving device 10 shown in FIG. 1 allows precise focus jumping even if there are variations in the distances between the recording surfaces of a disc (such as a BD) having a plurality of recording surfaces or variations in the sensitivity of, for example, an actuator of an optical pickup, or even if an external disturbance (such as vibration or shock) is further applied. To achieve this, in a related focus jumping method in which the polarity of a focus control signal is switched, while a focus servo loop is closed, the focus jumping is performed (that is, a focus position is moved) even at a location between each recording surface at which positive feedback is achieved.

The driving device 10 shown in FIG. 1 includes a turntable 21, a spindle motor (SPM) 22, a SPM driver 23, a servo processor 24, a focus error signal processing section 25, a laser diode (LD) driver 26, a device driver 27, a triaxial driver 28, a sled driver 29, a laser diode 30, a spherical aberration correcting device 31, a detector 32, a focus actuator 33, an objective lens 34, an optical pickup 35, a sled motor 36, a front end processor (FEP) 37, a binarizing section 38, a binarizing section 39, a decoder/encoder 40, and a system controller 41.

A disc 11 is placed on the turntable 21, and is rotationally driven at a certain linear velocity (CLV) or a certain angular velocity (CAV) by the SMP 22 when performing a recording or a reproducing operation. The rotational speed of the SPM 22 is controlled by the SPM driver 23. The optical pickup 35 records data or reproduces data recorded on the disc 11.

The optical pickup 35 can record data on different types of discs 11, and can reproduce data recorded on the different types of discs 11. When the disc 11 is placed on the turntable 21, and a recording operation or a reproducing operation is performed, a laser beam emitted from the laser diode 30 of the optical pickup 35 through the objective lens 34 is used to illuminate a recording surface of the disc 11. Light reflected from the recording surface is detected by the detector 32, is converted into an electrical signal, and is supplied to the FEP 37.

The FEP 37 includes, for example, a current/voltage converting section, an amplifying section, and a matrix calculating section, and generates a required signal on the basis of a signal from the detector 32. The FEP 37 generates, for example, an RF signal (which corresponds to reproduction data), a focus error signal (FE signal) for servo control, a tracking error signal (TE signal), a pull-in signal (PI signal, which is what is called a sum signal), and a Wobble signal (including address information on the disc).

The various signals generated by the FEP 37 are supplied to the binarizing section 38, the binarizing section 39, and the focus error signal processing section 25 of the servo processor 24. That is, from the FEP 37, the reproduction RF signal is supplied to the binarizing section 38, the Wobble signal is supplied to the binarizing section 39, and the FE signal, the TE signal, and the PI signal are supplied to the focus error signal processing section 25 in the servo processor 24.

The reproduction RF signal obtained by the FEP 37 is binarized by the binarizing section 38. By this operation, when the disc 11 is a CD or a DVD, what is called an EFM signal (8-14 modulation signal) or EFM+signal (8-16 modulation signal) is supplied to the decoder 40. When the disc is a hybrid disc, a combination of the aforementioned signals is supplied to the decoder 40.

The decoder 40 performs, for example, EFM modulation and CIRC decoding, and, if necessary, the decoder 40 performs, for example, moving picture experts group (MPEG) decoding, so that information read from the disc 11 is reproduced.

When the disc 11 is a BD, the reproduction RF signal is subjected to a PRML signal processing operation through a limit equalizer (not shown) at the binarizing section 38, is set to a 1-7PP signal (1-7PP modulation system), and is supplied to the decoder 40. The decoder 40 performs, for example, the 1-7PP modulation or LDC decoding with BIS, to reproduce information read from the disc 11.

From the FE signal and TE signal from the FEP 37, an FG signal from the SPM 22, or a spindle error signal (SPE signal) from the system controller 41, the servo processor 24 generates a focus actuator driving signal, a tracking actuator driving signal, a sled motor driving signal, a spindle motor driving signal, and a driving signal for, for example, focus jumping or track jumping.

When the disc 11 is subjected to a reproducing operation, a focus driving signal and a tracking driving signal, generated in accordance with the FE signal and the TE signal from the FEP 37, are supplied to the triaxial driver 28. The triaxial driver 28 drives a triaxial mechanism (a tracking actuator, a focus actuator, and a tilt actuator) in the optical pickup 35. This causes a tracking servo loop and a focus servo loop to be formed by the optical pickup 35, the FEP 37, the servo processor 24, and the triaxial driver 28.

The servo processor 24 supplies a spindle driving signal, generated in accordance with the FG signal or the spindle error signal (SPE signal), to the SPM driver 23. In accordance with the spindle driving signal, the SPM driver 23 applies, for example, a three-phase driving signal to the SPM 22, so that the SPM 22 is caused to rotate the disc at CAV or at CLV. In accordance with a spindle kick/brake control signal from the system controller 41, the servo processor 24 generates the spindle driving signal, so that the SPM driver 23 also causes the SPM 22 to start operating or to stop.

The servo processor 24 generates, for example, a sled error signal (obtained from, for example, the TE signal), and a sled driving signal on the basis of, for example, access execution control of the system controller 41, and supplies the signals to the sled driver 29. Then, the sled driver 29 drives the SPM 22 in accordance with the sled driving signal, to properly slide the optical pickup 35.

The laser diode 30 in the optical pickup 35 is driven on the basis of laser emission by the LD driver 26. The servo processor 24 generates a laser driving signal for executing the laser emission of the optical pickup 35 when, for example, a reproducing operation is performed on the basis of an instruction from the system controller 41. The servo processor 24 supplies the laser driving signal to the LD driver 26, and causes the laser diode 30 to emit light in accordance with the disc 11 subjected to the reproduction operation.

In addition, the servo processor 24 corrects a tilt of the disc 11 in accordance with a tilting state of the disc 11. The servo processor 24 supplies to the triaxial driver 28 a tilt driving signal in accordance with detection information obtained from signals (such as the tracking error signal, a RF jitter signal, and a RF amplification level signal) correlated to the tilting state of the disc 11. This causes the triaxial mechanism (tilt actuator) to be driven, to perform a tilt servo operation. Focus jumping is performed by detecting an FE signal level at the focus error signal processing section 25 in the servo processor 24, and by driving the focus actuator 33 at a predetermined timing.

When data is recorded, the data to be recorded is input to the encoder 40. The encoder 40 performs error correction and modulation. The servo processor 24 performs a recording compensation operation on the modulated data to be recorded, generates the laser driving signal, and supplies it to the LD driver 26, so that the light emission of the laser diode 30 is controlled in accordance with the disc 11 on which the data is to be recorded.

When the optical disc 11 is a BD, for achieving high capacity and high reliability, the wavelength of the laser diode 30 is reduced to a LD wavelength of 405 nm, the objective lens 34 is made to have a numerical aperture (NA) of 0.85, and the thickness of a disc cover layer of the disc 11 is set to 100 μm. Since spherical aberration is inversely proportional to the wavelength and increases in proportion to the fourth power of NA, when compared to a DVD or a CD, spherical aberration tends to occur in the BD, thereby making it necessary to correct the spherical aberration in the BD. Therefore, the servo processor 24 corrects the spherical aberration by driving the spherical aberration correcting device 31 such as a spherical aberration liquid crystal device or a lens driving device through the device driver 27.

Various operations, such as the aforementioned servo operation and decoding operation, are controlled by the system controller 41 formed by a microcomputer. For example, when starting a reproducing operation, ending a reproducing operation, performing a track access operation, performing a fast-forward reproducing operation, or performing a fast reverse operation, the system controller 41 controls the operation of the servo processor 24 and the operation of the optical pickup 35.

Figure 2:
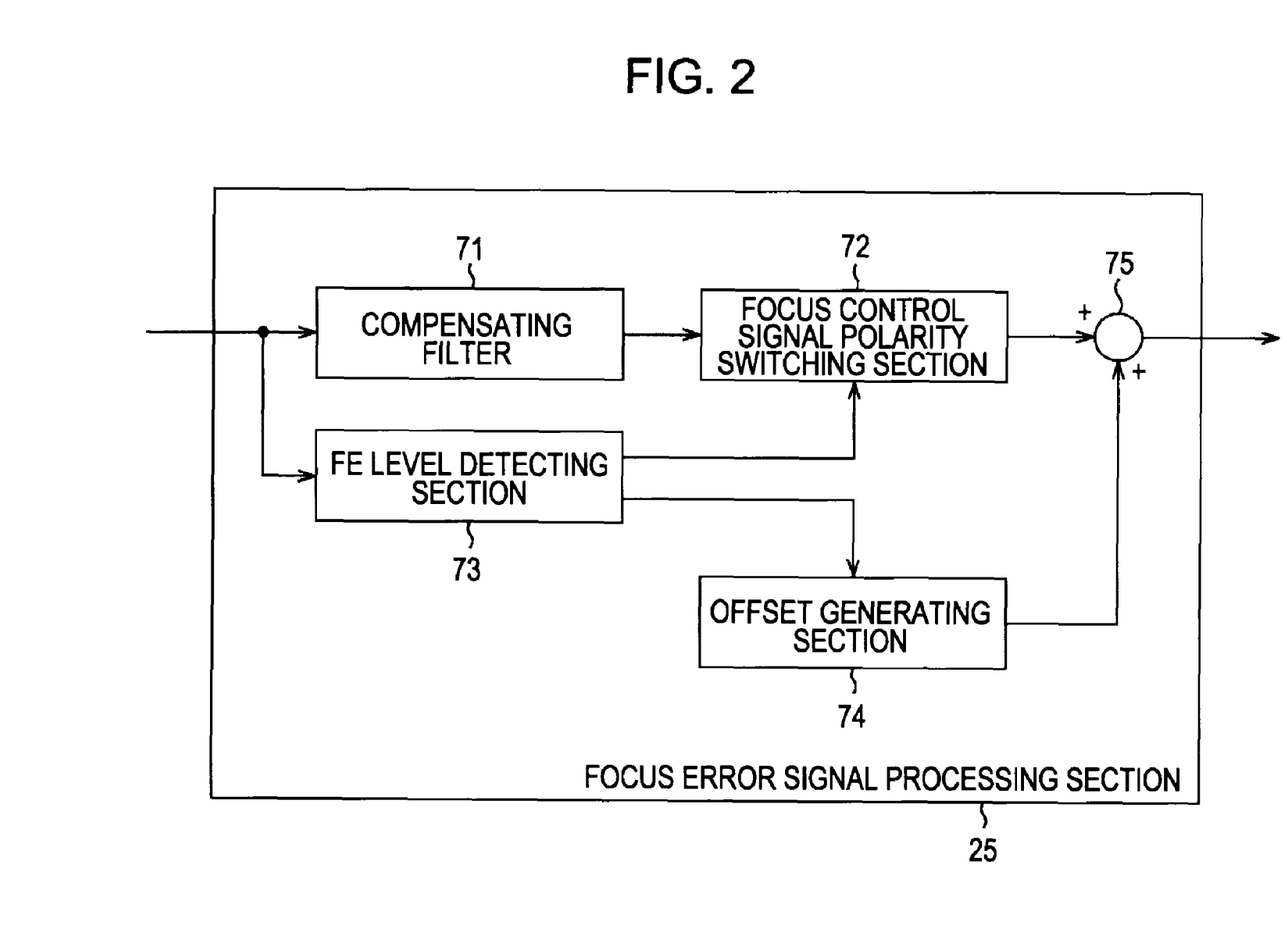
FIG. 2 shows an exemplary structure of a focus error signal processing section.

FIG. 2 is a block diagram of the focus error signal processing section 25 in the servo processor 24. The focus error signal processing section 25 includes a compensating filter 71, a focus control signal polarity switching section 72, a focus error signal (FE) level detecting section 73, an offset generating section 74, and an adding section 75.

The FE signal input from the FEP 37 is output as a focus actuator driving signal to the triaxial driver 28 through the compensating filter 71 and the focus control signal polarity switching section 72.

The FE signal is also supplied to the FE level detecting section 73. The FE level detecting section 73 detects the level of the supplied FE signal. The output of the FE level detecting section 73 is supplied to the offset generating section 74.

The offset generating section 74 generates an offset signal for focus jumping, and supplies it to the adding section 75. The adding section 75 adds the offset signal and an output from the focus control signal polarity switching section 72 to each other, and outputs the resulting signal as a focus actuator driving signal (FCS_CTL signal) to the triaxial driver 28.

When the disc 11 has a plurality of recording layers, and a signal of a first data recording surface layer or a second data recording surface layer is to be reproduced, the focus control signal polarity switching section 72 switches the polarity of its signal to a polarity at which negative feedback is achieved at the recording surface.

An output of the compensating filter 71 is output as a focus actuator driving signal to the focus control signal polarity switching section 72. When focus jumping is performed, the offset generating section 74 outputs an offset signal. The focus control signal polarity switching section 72 switches the polarity of its signal to a polarity at which negative feedback is achieved (focus servo is performed between layers) at a location between the first and second recording surfaces. The adding section 75 adds the signals thereof, and outputs the resulting signal as a focus actuator driving signal.

At this time, when the FE level detecting section 73 detects the level of the FE signal, control is performed so that the polarity is switched by the focus control signal polarity switching section 72 at a predetermined timing, or so that the offset generating section 74 outputs an offset signal.

Before describing the operations of the driving device 10 shown in FIG. 1 that performs the above-described operations, that is, before primarily describing the operations of the focus error signal processing section 25 shown in FIG. 2, the disc 11 will be described with reference to FIGS. 3 and 4.

Figure 3:
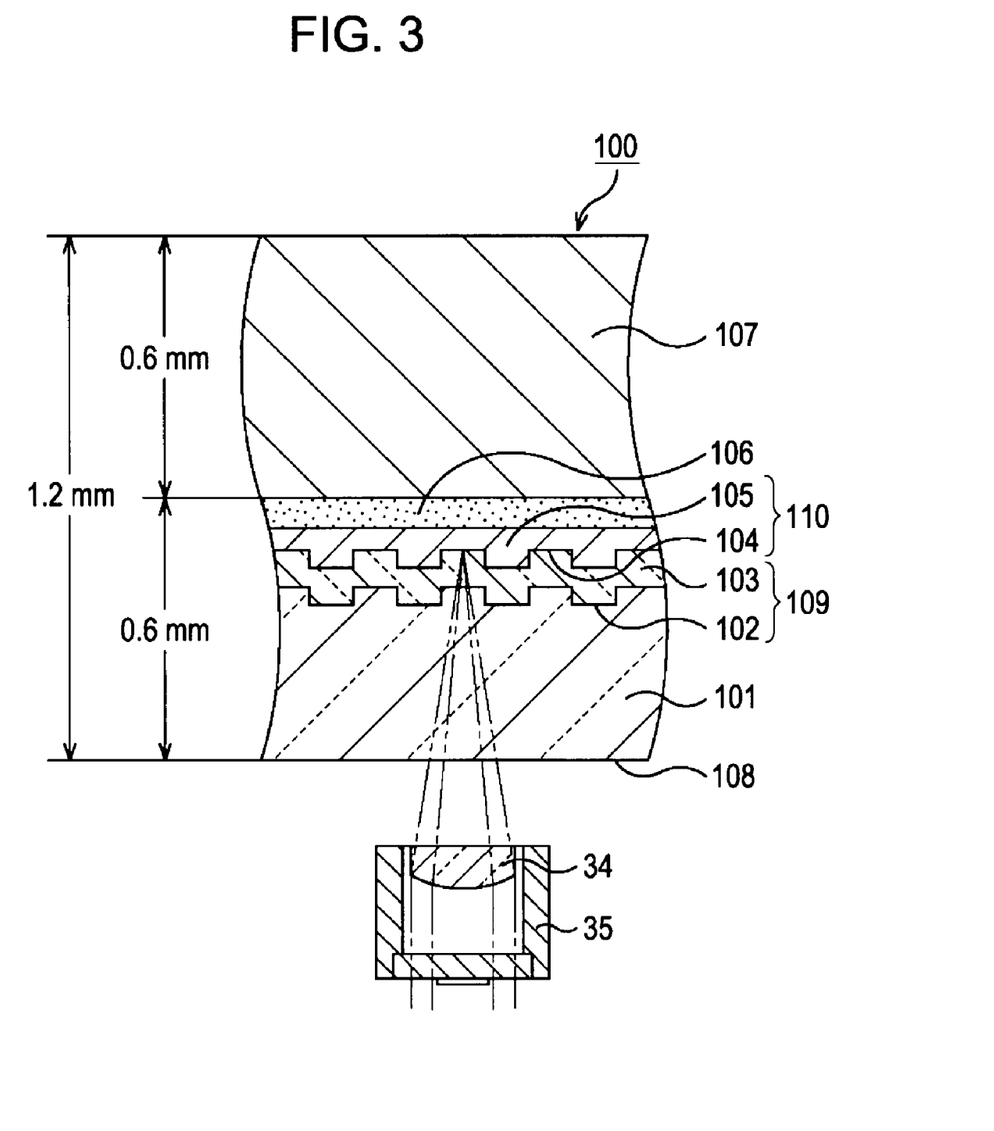
FIG. 3 illustrates the structure of a DVD.

FIG. 3 illustrates the structure of the disc 11 when the disc 11 is a DVD. DVDs are available in two types, that is, DVD-SL having one recording surface and a DVD-DL having two recording surfaces. FIG. 3 shows an exemplary structure of the DVD-DL.

In the DVD-DL 100 shown in FIG. 3, a first signal surface 102 is formed at a disc substrate 101 which is transparent like polycarbonate resin, a second signal surface 104 is formed above the first signal surface 102, and a dummy plate 107 is bonded to the second signal surface 104. That is, a first data recording surface layer 109 includes the first signal surface 102 and a semitransparent layer 103 corresponding to the first signal surface 102. A second data recording surface layer 110 includes the second signal surface 104 and a reflecting layer 105 corresponding to the second signal surface 104. An adhesive surface 106 is formed above the second data recording surface layer, and the dummy plate 107 is adhered to the adhesive surface 106, so that the thickness of the DVD-DL 100 is the same as that of, for example, a CD.

The diameter of the DVD-DL 100 is 12 cm, which is the same as that of a CD. The thickness of the first data recording surface layer 109 and that of the second data recording surface layer 110 are such that a position of substantially 0.6 mm (1.2 mm for a CD) is reached. Therefore, when the laser beam from the optical pickup 35 is focused at the first signal surface, the laser beam is transmitted through the semi-transparent layer 103, and a certain proportion thereof is reflected.

By this, if the laser beam is focused at the first signal surface 102, a signal recorded on the first signal surface 102 can be read from light reflected from the semi-transparent layer 103. When the focus of the laser beam is at the second signal surface 104, the laser beam is transmitted through the semi-transparent layer 103, and is used to illuminate the second signal surface 104; and a signal recorded on the second signal surface 104 can be read from light reflected by the reflecting layer 105. For a disc having one layer, the signal surface and the reflecting layer are formed similarly to the second signal surface 104 and the reflecting layer 105.

Figure 4:
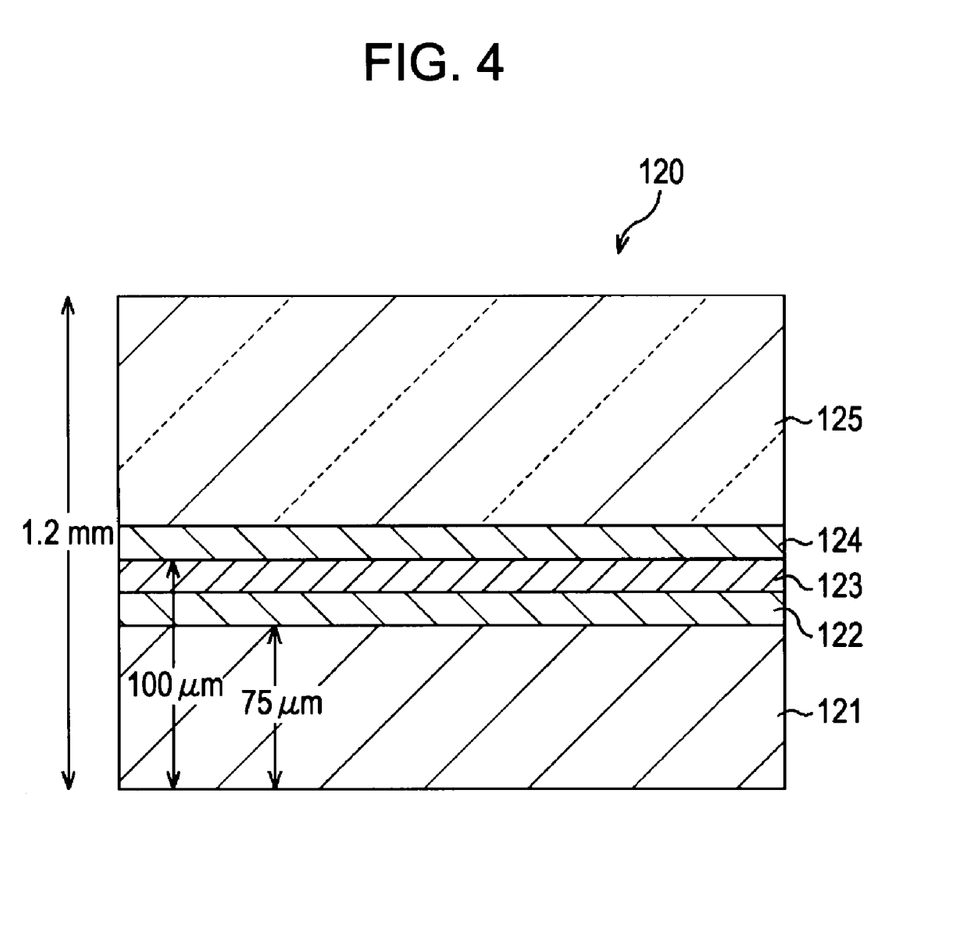
FIG. 4 illustrates the structure of a BD.

FIG. 4 shows an exemplary structure of a BD. Like DVDs, BDs are standardized in two types, BD-SL having one recording surface, and BD-DL having two recording surfaces.

A BD 120 also has two recording surfaces, and has a structure that is substantially the same as that of the DVD 100 shown in FIG. 3. The BD 120 has a cover layer 121. In the BD 120, a L1 recording surface 122, serving as a first recording surface, is provided at the upper portion of the cover layer 121. The distance (thickness) from the surface of the cover layer 121 to the L1 recording surface is 75 μm. An intermediate layer 123 is provided at the upper portion of the L1 recording surface 122, and a L0 recording surface 124, serving as a second recording surface, is provided at the upper portion of the intermediate layer 123. The distance (thickness) from the surface of the cover layer 121 to the L0 recording surface 124 is 100 μm.

A polycarbonate substrate 125 is provided at the upper portion of the L0 recording surface 124. By providing the polycarbonate substrate 125, the thickness of the BD 120 becomes 1.2 mm, which is the same as those of a CD and a DVD.

When data is recorded on the disc 11 having a plurality of recording surfaces, or when data recorded on the disc 11 is reproduced, it is necessary to move the pickup to a different recording layer. At this time, what is called focus jumping is performed. Next, the focus jumping will be described.

In the following description, first, the focus jumping will be described taking the DVD 100 shown in FIG. 3 as an example of the disc 11. The case in which the DVD 100 is handled as the disc 11 will be described in a first embodiment, and, as discussed below, the case in which the BD 120 is handled will be described in a second embodiment.

Figure 5:
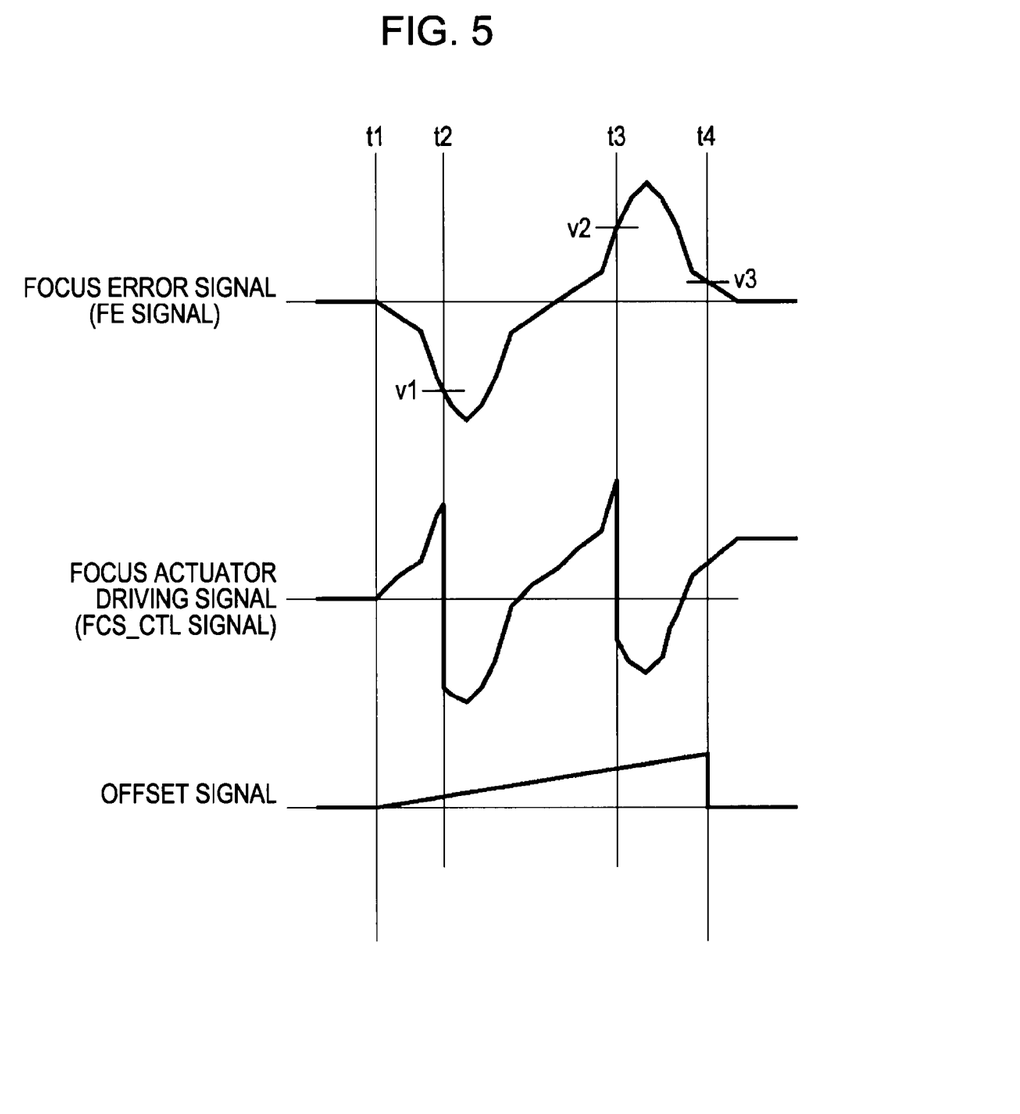
FIG. 5 illustrates control of focus jumping.
Figure 6:
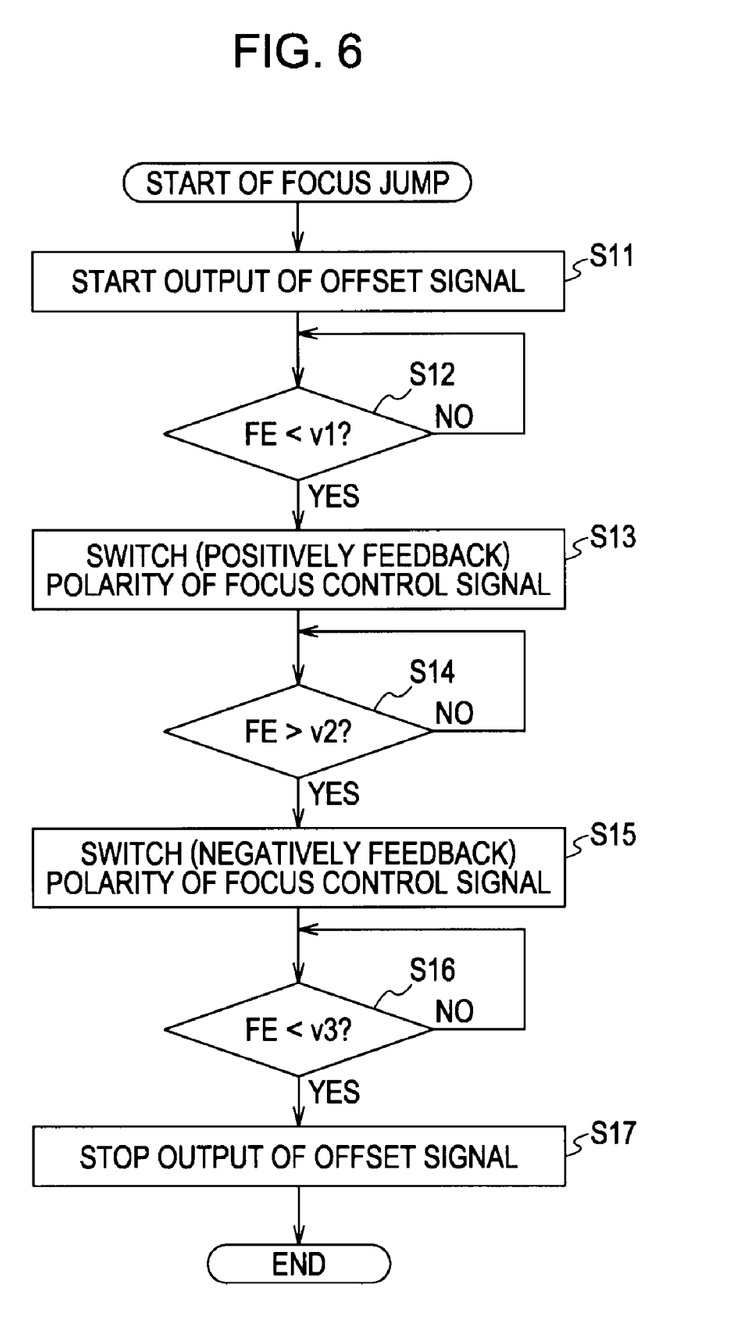
FIG. 6 is a flowchart of the control of the focus jumping.

FIG. 5 is a time chart for switching the polarity by the focus control signal polarity switching section 72. FIG. 6 is a flowchart for primarily illustrating the operations performed by the focus error signal processing section 25 (FIG. 2) for achieving the time chart shown in FIG. 5.

In Step S11, the offset generating section 74 starts to generate an offset signal. For example, it is assumed that an instruction for performing focus jumping with respect to the second data recording surface layer 110 is given to the servo processor 24 from the system controller 41 during reproduction performed on the first data recording surface layer 109 of the DVD 100 shown in FIG. 3. When such an instruction is given, the servo processor 24 causes an offset signal to be output from the offset generating section 74 in the focus error signal processing section 25.

When the adding section 75 adds the offset signal and a focus control signal to each other, and the resulting signal is applied to the focus actuator 33 through the triaxial driver 28, the objective lens 34 moves towards the second data recording surface layer 110 of the disc 11. As a result, the focus position of the laser beam emitted from the laser diode 30 of the optical pickup 35 is moved towards the second data recording surface layer 110.

When the offset generating section 74 starts generating the offset signal, the FE level detecting section 73 in the focus error signal processing section 25 of the servo processor 24 typically monitors the FE signal from a starting point thereof (time t1). When the offset generating section 74 starts generating the offset signal, it also increases the level of the offset signal in accordance with time. That is, as shown in FIG. 5 (lower graph in FIG. 5), the offset signal is gradually increased (by a certain proportion) from the time t1, and is generated until a time t4. As mentioned later, the time t4 is a time when the focus jumping ends.

In Step S12, it is determined whether or not the level of the FE signal is less than a threshold value v1. Referring to the upper graph shown in FIG. 5, the FE signal is a signal whose level is gradually reduced from the time t1, becomes equal to the previously set threshold value v1 at a time t2, and is reduced even past the time t2.

In Step S12, when it is determined that the level of the FE signal is less than the threshold value v1, in Step S13, the focus control signal polarity switching section 72 switches the polarity of the focus control signal to a polarity at which positive feedback is achieved between the first recording surface and the second recording surface (focus servo is performed between the surfaces). With reference to the center graph in FIG. 5, since the level of the offset signal is increased, the focus actuator driving signal is a signal whose level is gradually increased from the time t1 to the time t2. At the time t2, when the level of the FE signal is less than the threshold value v1, the focus control signal polarity switching section 72 switches the polarity of the focus actuator driving signal to a polarity at which positive feedback is achieved.

Thereafter, while the focus servo loop is closed, the objective lens 34 moves from the first data recording surface layer 109 to the second data recording surface layer 110 on the basis of the offset signal. By this, the focus position of the laser beam from the laser diode 30 is brought close to the second data recording surface layer 110.

If the polarity is not switched, the threshold value v1 is set to a value of the FE signal that is determined as that obtained when the servo operation is displaced. Similarly, if the polarity is not switched, a threshold value v2 (described below) is set to the value of the FE signal that is determined as that obtained when the servo operation is displaced.

In Step S14, it is determined whether or not the level of the FE signal is greater than the threshold value v2. With reference to the upper graph in FIG. 5, from the time t2, the level of the FE signal is reduced once, and is then gradually increased. At a time t3, the value of the FE signal becomes equal to the threshold value v2. Thereafter, the FE level detecting section 73 determines that the level of the FE signal is greater than the threshold value v2. Between the time t2 and the time t3, the focus actuator driving signal is also dependent upon the increase in the level of the offset signal, so that it becomes a signal whose level is gradually increased.

In Step S15, the focus control signal polarity switching section 72 switches the polarity of the focus control signal to a polarity at which negative feedback is achieved at the second data recording surface layer 110. When the focus control signal polarity switching section 72 switches the polarity at which the negative feedback is achieved, as shown in the center graph in FIG. 5, the focus actuator driving signal becomes a signal whose polarity at the time t3 is switched to a directly opposite polarity.

In Step S16, it is determined whether or not the level of the FE signal is less than a threshold value v3. With reference to the upper graph of FIG. 5, the value of the FE signal is temporarily increased from the time t3, and is then gradually reduced. At the time t4, the level of the FE signal becomes equal to the threshold value v3. Thereafter, the FE level detecting section 73 determines that the level of the FE signal is less than the threshold value v3. From the time t3 to the time t4, the focus actuator driving signal is a signal whose level is reduced once, and is gradually increased.

In Step S16, the determination that the level of the FE signal is less than the threshold value v3 indicates that a determination is made that the objective lens 34 has sufficiently moved to a pull-in position for a focus servo operation. Accordingly, the threshold value v3 is set to a value of the FE signal that is provided when it is determined that the objective lens 34 is sufficiently moved to the pull-in position for the focus servo operation.

When, in Step S16, it is determined that the level of the FE signal is less than the threshold value v3, the generation of the offset signal from the offset generating section 74 is stopped in Step S17. When the generation of the offset signal is stopped, the operations for the focus jumping end.

Accordingly, it is detected that the FE signal level exceeds a predetermined value during the output of the offset signal, and the polarity of the focus actuator driving signal (focus control signal) is switched. By this, even between the first recording surface and the second recording surface, it is possible to perform the focus jumping (focus movement) while the focus servo loop is closed. In addition, even if there are variations in the focus actuator, variations in the distance between the plurality of recording layers, or external disturbances (such as vibration or shock), it is possible to perform a precise jumping operation by focusing the laser beam on a target recording surface.

Next, a second embodiment of the present invention will be described. The second embodiment can be achieved by using the structure of the driving device 10 and the structure of the focus error signal processing section 25 included in the driving device 10. The second embodiment is primarily desirably applied to the case in which the disc 11 is the BD 120. When performing a recording operation or a reproducing operation on the BD 120, it is necessary to correct spherical aberration. Therefore, the second embodiment is an embodiment in which the correction of spherical aberration is considered.

Figure 7:
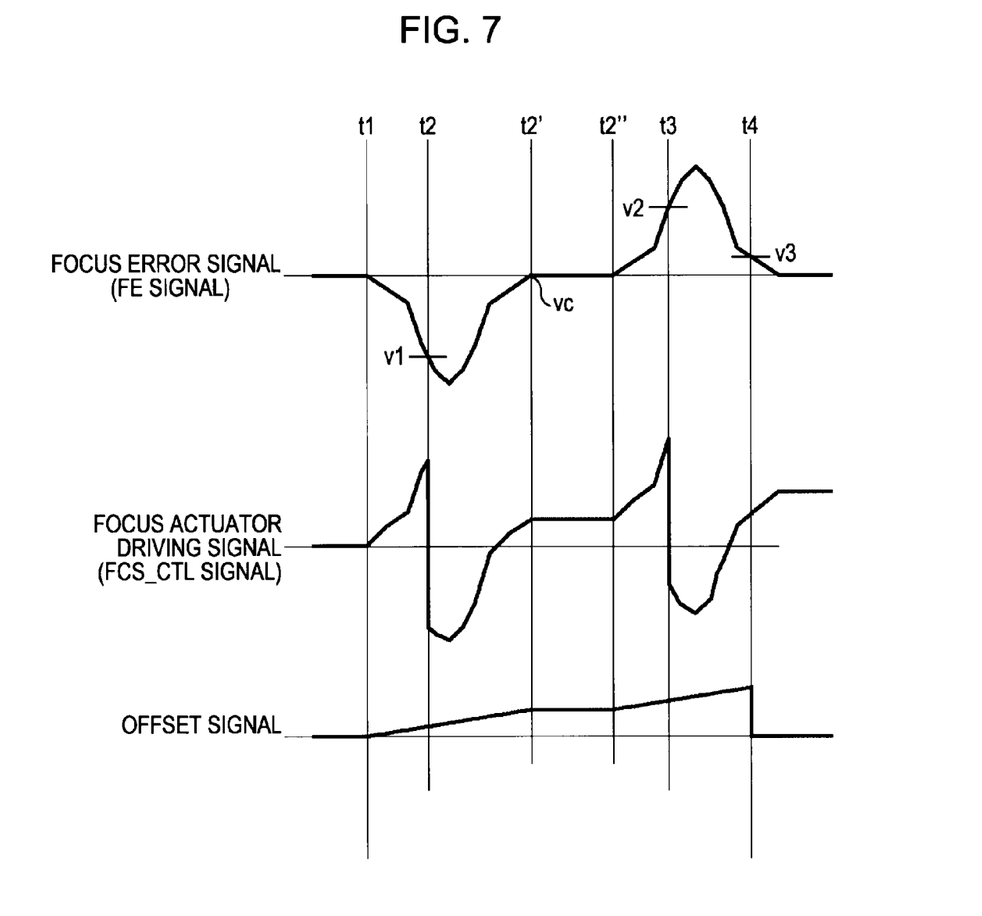
FIG. 7 illustrates control of focus jumping.
Figure 8:
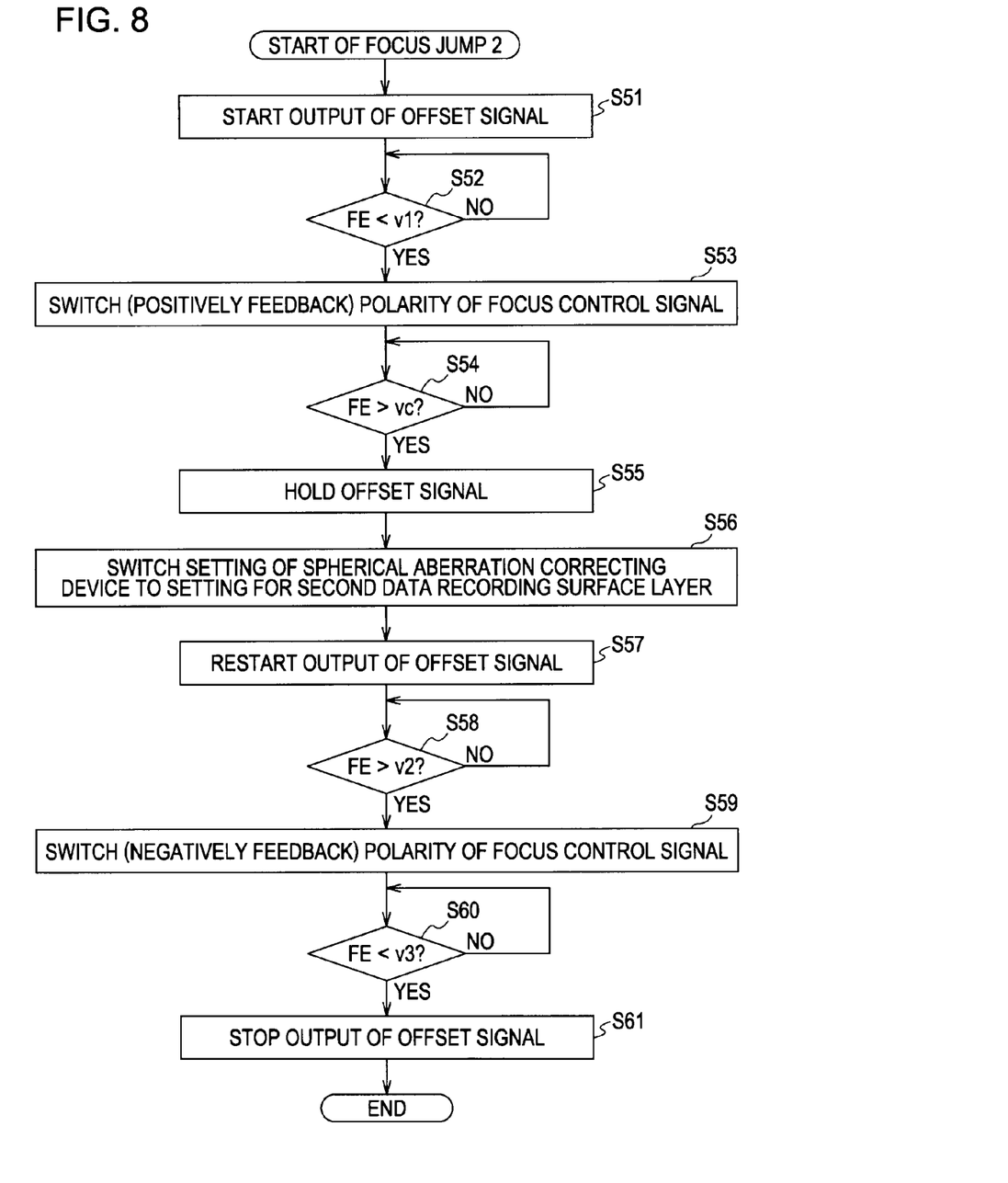
FIG. 8 is a flowchart of the control of the focus jumping.

FIG. 7 is a time chart for switching the polarity by the focus control signal polarity switching section 72. FIG. 8 is a flowchart for primarily illustrating the operations carried out by the focus error signal processing section 25 (FIG. 2) for achieving the time chart shown in FIG. 7.

The operations in Step S51 to Step S53 are the same as those in Step S11 to S13 shown in FIG. 6, so that they will not be described.

When, in Step S53, the focus control signal polarity switching section 72 switches the polarity of the focus control signal, then, in Step S54, the FE level detecting section 73 determines whether or not the level of the FE signal is greater than a threshold value vc. Referring to the upper graph in FIG. 7, the FE signal is a signal in which, from the time t2, its level is reduced once and is gradually increased, and, at a time t2', its level becomes a value that is equal to the threshold value vc. Thereafter, the FE level detecting section 73 determines that the level of the FE signal is greater than the threshold value vc.

When the FE level detecting section 73 determines that the level of the FE signal is greater than the threshold value vc, it gives an instruction to the offset generating section 74 to maintain the magnitude of the offset signal for this time. That is, in Step S55, the offset generating section 74 continues generating the offset signal for this time whose magnitude is maintained.

In Step S56, the servo processor 24 drives the device driver 27, and switches the setting of the spherical aberration correcting device 31 to a setting for the second data recording surface layer (setting for a recording surface that is specified as a movement destination). In Step S57, the offset generating section 74 starts generating the offset signal again.

The operations from Step S54 to Step S57 are carried out for maintaining the level of the offset signal to a constant value while the spherical aberration correcting device 31 is operating. Referring to the upper graph in FIG. 7, from the time t2' (at which the level of the FE signal is greater than the threshold value vc) to a time t2" (reached when a predetermined time has elapsed from the time t2'), the level of the offset signal is maintained as shown in the lower graph in FIG. 7. In addition, during this time, as shown in the center graph in FIG. 7, the level of the focus actuator driving signal is also held at a certain value. As a result, as shown in the upper graph in FIG. 7, the FE signal is a signal that does not change. During this time, the spherical aberration correcting device 31 operates.

The time from the time t2' to the time t2" is a time allowing the spherical aberration correcting device 31 to operate or is a time required to operate the spherical aberration correcting device 31.

Accordingly, when the spherical aberration correcting device 31 operates, and the level of the offset signal from the offset generating section 74 is no longer maintained, the process proceeds to Step S58. The operations in Steps S58 to S61 are the same as those in Step S14 to S17 shown in FIG. 6, so that they will not be described.

In addition to providing the advantages of the first embodiment, the second embodiment makes it possible to ensure a time for suitably setting the spherical aberration correcting device 31 to a target recording layer of the disc 11 (such as a BD) where spherical aberration needs to be corrected during the focus jumping. Therefore, it becomes possible to correct spherical aberration. Consequently, it becomes possible to increase the precision with which the threshold value of the FE signal is detected. As a result, it is possible to switch the polarity of the focus control signal at a proper timing. Thus, even if there are variations in the level of the FE signal resulting from spherical aberration, it is possible to carry out a precise focus jumping operation by focusing the laser beam on a target recording surface.

In each of the above-described first and second embodiments, the focus jumping operation is described using the threshold values v1, v2, v3, and vc. However, in place of such threshold values, it is possible to use a predetermined time to execute the same focus jumping operation. The predetermined time may be, for example, a time that elapses from a time when the generation of the offset signal is started.

For example, the form of the FE signal shown in the upper graph in FIG. 5 is called, for example, an S-shaped curve. Therefore, even the time at which its level is equal to the threshold value v1 can be set with reference to the time when the generation of the offset signal is started. Similarly, the other threshold values can be set with reference to the time at which the generation of the offset signal is started. Consequently, the focus jumping operation may be carried out using this time instead of the threshold values.

When the focus jumping operation is controlled using this time, for example, in the flowchart shown in FIG. 6, the operation in Step S12 is an operation for determining whether or not a predetermined time t1 has elapsed from the time of generation of the offset signal. Similarly, the other determination steps, such as Step S16, are carried out by determining whether or not a predetermined passage time has elapsed.

In the above-described first and second embodiments, the offset signal generated by the offset generating section 74 is described as being a signal whose level is gradually increased (that is, is increased by a certain proportion). However, instead of being a signal whose level is increased by a certain proportion, the offset signal may be a variable signal whose magnitude changes (refer to the FE signal). That is, referring to FIG. 2, the offset generating section 74 is formed so that a signal is supplied thereto from the FE level detecting section 73. Therefore, the offset generating section 74 can generate the offset signal in accordance with the signal supplied from the FE level detecting section 73. Even in such a case, the operations are carried out in the same way as described above, so that they will not be described.

According to the present invention, when the focus position is moved from one recording layer of an optical disc having a plurality of layers to another recording layer thereof, as described in the embodiments, the following is performed. That is, by suitable switching the polarity of the focus control signal, it is essentially possible to execute the focus jumping operation while the focus servo loop is closed, without stopping the focus servo operation. Therefore, the focus jumping operation can be stably carried out even if there are variations in the sensitivity of the focus actuator, variations in the distances between the recording surfaces of an optical disc, or external disturbances (such as vibration or shock).

The detection levels can be arbitrarily set. Therefore, if the levels are set to suitable values in accordance with, for example, the characteristics of the optical pickup and the characteristics of the optical disc, the focus jumping can be stably performed.

Further, as described in the second embodiment, by correcting spherical aberration during the focus jumping operation, it is possible to stably perform the focus jumping operation on an optical disc (such as a BD) where spherical aberration needs to be corrected.

The above-described embodiments are described using a disc having two recording surfaces as an example. Even when a multi-layer disc having more than two layers is standardized and handled, it is possible to apply the present invention thereto. This makes it possible to stably carry out the focus jumping operation even when there are variations in the distances between the layers.

In the above-described embodiments, when the level of the FE signal and the threshold value are compared with each other, it is determined whether the level of the FE signal is less than or greater than the threshold value. However, it is possible to determine whether or not the level of the FE signal is equal to or greater than the threshold value or less than or equal to the threshold value.

In the above-described embodiments, the level of the FE signal may be such that its polarity is different from that mentioned above. That is, for example, in the passage that describes the polarity of the level of the FE signal as being positive, the level of the FE signal may be negative. Therefore, when the level of the FE signal is compared with the threshold value, the absolute value of the level of the FE signal and the threshold value may be compared with each other.

The above-described operations, such as the comparison between the threshold value and the level of the FE signal when focus jumping is performed, may be executed using hardware or software. When the operations are executed by using software, the software is installed from a program recording medium to, for example, a computer in which a program of the software is incorporated in a dedicated hardware or a general-purpose personal computer capable of executing various functions as a result of installing various programs.

Figure 9:
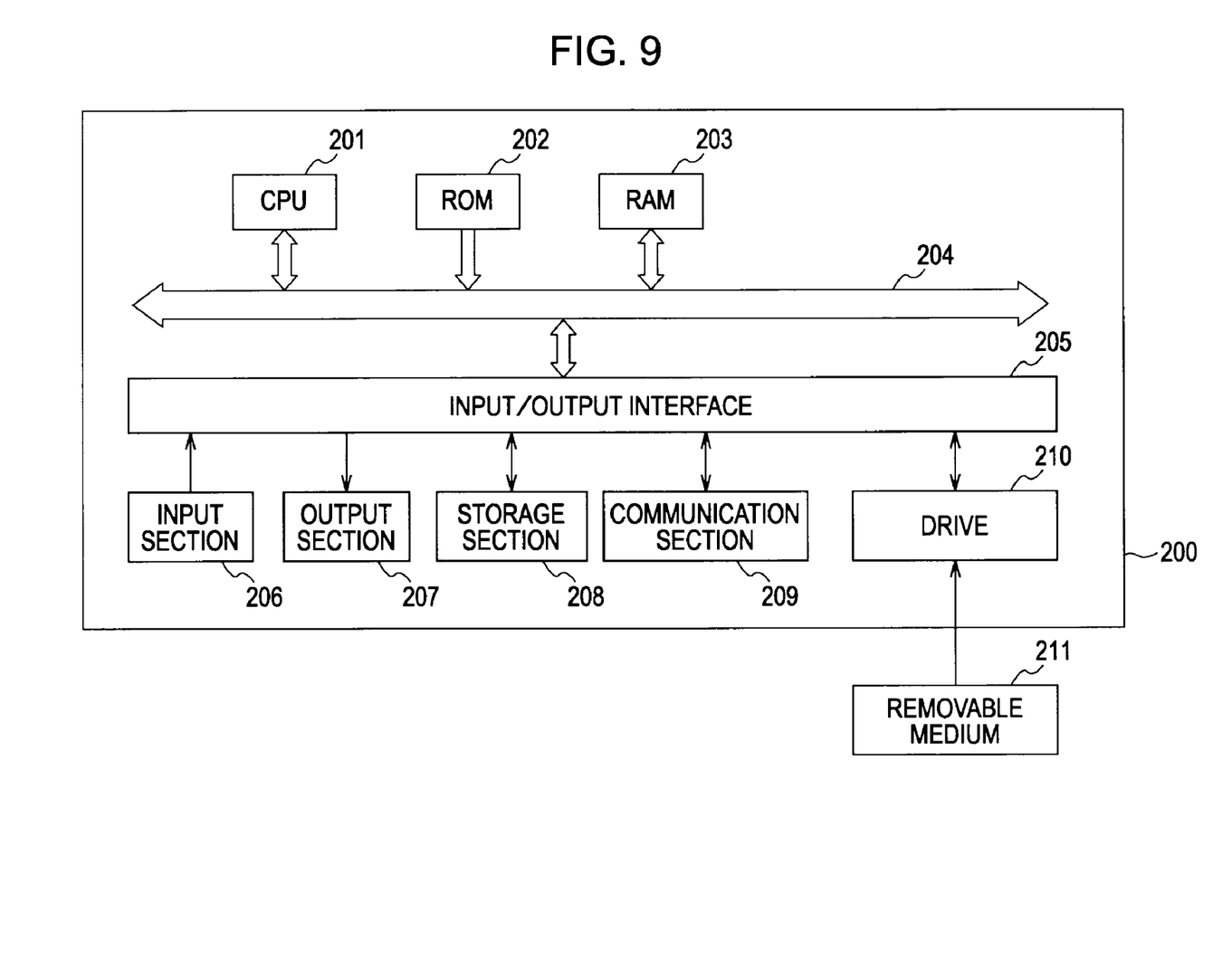
FIG. 9 illustrates a recording medium.

FIG. 9 is a block diagram of an exemplary structure of hardware of a personal computer that executes the above-described operations using a program.

In the computer, a central processing unit (CPU) 201, a read only memory (ROM) 202, and a random access memory (RAM) 203 are connected to each other through a bus 204.

An input/output interface 205 is connected to the bus 204. An input section 206 (including, for example, a keyboard, a mouse, and a microphone), an output section 207 (including, for example, a display and a speaker), a storage section 208 (including, for example, a hard disc and a nonvolatile memory), a communication section 209 (including, for example, a network interface), and a drive 210 that drives a removable medium 211 (such as a magnetic disc, an optical disc, a magneto-optical disc, or a semiconductor memory) are connected to the input-output interface 205.

In the computer having the above-described structure, for example, the CPU 201 loads a program stored in the storage section 208 to RAM 203 through the input-output interface 205 and the bus 204, and executes the program, to carry out the operations.

The program executed by the computer (CPU 201) is provided by recording it on the removable medium 211 (which is a package medium), such as a magnetic disc (including a flexible disc), an optical disc (compact disc-read only memory (CD-ROM)), a digital versatile disc (DVD), a magneto-optical disc, or a semiconductor memory. Alternatively, the program executed by the computer is provided through a wire or a wireless transmission medium, such as a local area network, the internet, or digital satellite broadcasting.

When the removable medium 211 is mounted to the drive 210, the program may be installed in the storage section 208 through the input/output interface 205. Alternatively, when a signal is received by the communication section 209 through a wire or a wireless transmission medium, the program may be installed in the storage section 208. Still alternatively, the program may be previously installed in ROM 202 or the storage section 208.

The program that is executed by the computer may be a program for carrying out time-series operations in accordance with the order in which the operations are described in the specification. Alternatively, the program may be a program for carrying out the operations in parallel or at a required timing such as when a calling operation is performed.

In the specification, the term "system" represents the entire apparatus including a plurality of devices.

The present application contains subject matter related to that disclosed in Japanese Priority Patent Application JP 2008-172460 filed in the Japan Patent Office on Jul. 1, 2008, the entire content of which is hereby incorporated by reference.

The present invention is not limited to the above-described embodiments so that various modifications may be made without departing from the gist of the present invention.

What is claimed is:

1. A driving device comprising:
    optical pickup means for irradiating a disc having a plurality of recording surfaces with a laser beam used for recording or reproducing information; and
    generating means for generating a focus control signal used for controlling a focus state of the laser beam emitted from the optical pickup means on the basis of a focus error signal, the generating means including:
        level detecting means for detecting a level of the focus error signal,
        offset generating means for generating an offset signal in accordance with the focus error signal, and
        switching means for switching a polarity of the focus control signal by comparing the level of the focus error signal of the level detecting means with a threshold value, wherein
            the generated offset signal is added to the focus control signal to perform focus jumping from one of the plurality of recording surfaces to another one of the plurality of recording surfaces.

2. The driving device according to claim 1, wherein, when the level of the focus error signal becomes less than a first threshold value, the switching means switches the polarity, and when the level of the focus error signal becomes greater than a second threshold value, the switching means switches the polarity, and
    wherein, when the level of the focus error signal becomes less than a third threshold value, the offset generating means stops the generation of the offset signal.

3. A method of driving a driving device including optical pickup means for irradiating a disc having a plurality of recording surfaces with a laser beam used for recording or reproducing information, and generating means for generating a focus control signal used for controlling a focus state of the laser beam emitted from the optical pickup means on the basis of a focus error signal, the method comprising the steps of:
    detecting a level of the focus error signal;
    controlling generation of an offset signal in accordance with the focus error signal;
    switching a polarity of the focus control signal by comparing the level of the focus error signal with a threshold value; and
    adding the generated offset to the focus control signal to perform focus jumping from one of the plurality of recording surfaces to another one of the plurality of recording surfaces,
    wherein the generating means performs the detecting step, the controlling step, the switching step, and the adding step.

4. A non-transitory computer readable storage medium having computer executable instructions stored therein, which when executed by a processor in a driving device having optical pickup means for irradiating a disc having a plurality of recording surfaces with a laser beam used for recording or reproducing information and the generating means for generating a focus control signal used for controlling a focus state of the laser beam emitted from the optical pickup means on the basis of a focus error signal, causes the processor to perform a method comprising:
    detecting a level of the focus error signal;
    controlling generation of an offset signal in accordance with the focus error signal;
    switching a polarity of the focus control signal by comparing the level of the focus error signal with a threshold value; and
    adding the generated offset signal to the focus control signal to perform focus jumping from one of the plurality of recording surfaces to another one of the plurality of recording surfaces.

5. A driving device comprising:
    an optical pickup unit to irradiate a disc having a plurality of recording surfaces with a laser beam used for recording or reproducing information; and
    a generating unit to generate a focus control signal used for controlling a focus state of the laser beam emitted from the optical pickup unit on the basis of a focus error signal,
    the generating unit including:
        level detector to detect a level of the focus error signal,
        an offset generator to generate an offset signal in accordance with the focus error signal, and
        a switcher to switch a polarity of the focus control signal by comparing the level of the focus error signal of the level detector with a threshold value, wherein
            the generated offset signal is added to the focus control signal to perform focus jumping from one of the plurality of recording surfaces to another one of the plurality of recording surfaces.

6. A driving device comprising:
    optical pickup means for irradiating a disc having a plurality of recording surfaces with a laser beam used for recording or reproducing information; and
    generating means for generating a focus control signal used for controlling a focus state of the laser beam emitted from the optical pickup means on the basis of a focus error signal, the generating means including:
        level detecting means for detecting a level of the focus error signal,
        offset generating means for generating an offset signal in accordance with the focus error signal, and
        switching means for switching a polarity of the focus control signal by comparing the level of the focus error signal of the level detecting means with a threshold value, wherein the generated offset signal is added to the focus control signal to perform focus jumping from one of the plurality of recording surfaces to another one of the plurality of recording surfaces, wherein, when the level of the focus error signal becomes less than a first threshold value, the switching means switches the polarity, and when the level of the focus error signal becomes greater than a second threshold value, the switching means switches the polarity, wherein, when the level of the focus error signal becomes greater than a third threshold value, the offset generating means causes a level of the offset signal to be constant, wherein a spherical aberration is corrected while the level of the offset signal is constant, and wherein, when the correction of the spherical aberration ends, the offset generating means starts to output the offset signal again.

* * * * *